(12) United States Patent
Tielemans

(10) Patent No.: US 8,853,318 B2
(45) Date of Patent: Oct. 7, 2014

(54) AQUEOUS RADIATION CURABLE POLYURETHANE COMPOSITIONS

(75) Inventor: Michel Tielemans, Wemmel (BE)

(73) Assignee: Allnex Belgium S.A., Brussels (BE)

( * ) Notice: Subject to any disclaimer, the term of this patent is extended or adjusted under 35 U.S.C. 154(b) by 701 days.

(21) Appl. No.: 12/996,021

(22) PCT Filed: May 29, 2009

(86) PCT No.: PCT/EP2009/056615
§ 371 (c)(1),
(2), (4) Date: Dec. 3, 2010

(87) PCT Pub. No.: WO2009/147092
PCT Pub. Date: Dec. 10, 2009

(65) Prior Publication Data
US 2011/0086180 A1     Apr. 14, 2011

(30) Foreign Application Priority Data

Jun. 6, 2008   (EP) .................................. 08010311

(51) Int. Cl.
| | |
|---|---|
| *B05D 3/02* | (2006.01) |
| *B41M 1/30* | (2006.01) |
| *C03C 25/10* | (2006.01) |
| *C08G 18/08* | (2006.01) |
| *C08G 18/67* | (2006.01) |
| *C08K 3/20* | (2006.01) |
| *C08L 75/00* | (2006.01) |
| *C09D 175/14* | (2006.01) |
| *C08L 75/14* | (2006.01) |

(52) U.S. Cl.
CPC ............ *C09D 175/14* (2013.01); *C08G 18/675* (2013.01); *C08L 75/14* (2013.01); *Y10S 525/92* (2013.01)
USPC ..................... 524/507; 427/372.2; 427/385.5; 522/90; 522/96; 522/97; 522/98; 524/591; 524/839; 524/840; 525/455; 525/920

(58) Field of Classification Search
USPC .......... 522/90, 96, 97, 98; 524/507, 591, 839, 524/840; 525/455, 920; 427/372.2, 385.5
See application file for complete search history.

(56) References Cited

U.S. PATENT DOCUMENTS 5,905,113 A      5/1999    Licht et al.

FOREIGN PATENT DOCUMENTS

| CA | 2137621 A1 | 6/1995 |
|---|---|---|
| EP | 0249222 B1 | 1/1993 |
| EP | 1845143 A1 | 10/2007 |
| JP | 09-279017 | 10/1997 |
| JP | 2009-533504 | 9/2009 |

OTHER PUBLICATIONS

Technical Data Sheet EBECRYL™ 1290N, pp. 1-2, Oct. 2008.
International Search Report of PCT/EP2009/056615; mailed Sep. 11, 2009.
English translation of Notice of Opposition by BASF dated Dec. 5, 2012.
Office Action mailed on Sep. 20, 2013 in corresponding Japanese Application No. 2011-512082 (with English translation).

*Primary Examiner* — Patrick Niland
(74) *Attorney, Agent, or Firm* — Wenderoth, Lind & Ponack, L.L.P.

(57) ABSTRACT

The invention relates to radiation-curable aqueous composition comprising a high molecular weight ethylenically unsaturated polyurethane obtained from the reaction of a polyisocyanate, at least one hydrophilic compound which is capable to render the polyurethane prepolymer dispersible in aqueous medium, an ethylenically unsaturated compound containing at least two reactive groups capable to react with isocyanate groups and an active hydrogen containing chain extender and a low molecular weight ethylenically unsaturated polyurethane end-capped with an ethylenically unsaturated compound containing essentially one reactive group capable to react with isocyanate groups.

13 Claims, No Drawings

AQUEOUS RADIATION CURABLE POLYURETHANE COMPOSITIONS

This application is the U.S. National Phase application of International Application No. PCT/EP2009/056615, filed May 29, 2009 and published in English as WO 2009/147092, which claims benefit of priority from European Patent Application No. 08010311.2, filed Jun. 6, 2008, each of which is incorporated by reference herein in its entirety.

The invention relates to aqueous radiation-curable polyurethane compositions suitable for making coatings, especially color pigmented coatings having good mechanical and chemical resistance.

Aqueous radiation curable polyurethane dispersions are known since long to provide coatings for different substrates such as wood, plastics and metal which show a good mechanical and chemical resistance as well as flexibility.

Radiation curable polyurethanes have been made from the chain extension of isocyanate terminated ethylenically unsaturated polyurethane prepolymers with polyamines. The resulting polymers present a high molecular weight and contain hard urea segments that usually result in dispersions with a high minimum film formation temperature. The 'minimum film formation temperature' (MFFT) corresponds to the coalescence of the particles and the formation of a uniform defect-free film, which is generally physically dry. These high molecular weight polymers are somewhat resistant to mechanical and chemical stresses before curing or in conditions where radiation is not efficient, for instance in shadow cure area or in highly pigmented systems where radiation cannot penetrate easily; they are also suitable to deliver efficient chemical networks after additional thermal crosslinking A first drawback of these polymers is their relatively low reactivity and their limitations to obtain cured coatings with a good chemical resistance, such as stain resistance. A further limitation of this technology is the use of coalescing aids requested for film formation. These coalescing solvents, which are generally oxygenated compounds with a high boiling point, are at least partially eliminated upon application, which may cause severe safety and environmental issues. Radiation curable polyurethane dispersions obtained without chain extension generally provides polymers with a low molecular weight and a high acrylate bonds concentration that usually result in dispersions with a low MFFT and hence do not require the use of coalescing agents. They provide generally higher reactivity and a better chemical resistance. However, they are more sensitive to provide efficient deep curing in the bulk of the material when formulated with colored organic or inorganic pigments that interact with the UV light or electron beams and prevent the efficient penetration of the radiation into the coating. These compositions generally do not permit to obtain pigmented coatings which present high end hardness and scratch resistance.

We have now found radiation curable polyurethane dispersions which overcome these problems.

Therefore the present invention relates to an aqueous radiation-curable composition comprising:
  at least one high molecular weight ethylenically unsaturated polyurethane (A) obtained from the reaction of at least one polyisocyanate compound (Ai), at least one ethylenically unsaturated compound (Aii) containing at least two reactive groups capable to react with isocyanate groups, at least one hydrophilic compound (Aiii) containing at least one reactive group capable to react with isocyanate groups and which is capable to render the polyurethane prepolymer dispersible in aqueous medium either directly or after the reaction with a neutralizing agent to provide a salt, at least one active hydrogen-containing chain extender (Avii) capable to react with isocyanate groups and provide chain extension, and, optionally one or more polyol (Avi);
  at least one low molecular weight ethylenically unsaturated polyurethane (B), different from polyurethane (A), obtained from the reaction of at least one polyisocyanate compound (Bi), at least one ethylenically unsaturated compound (Bii) containing at least two reactive groups capable to react with isocyanate groups, at least one hydrophilic compound (Biii) containing at least one reactive group capable to react with isocyanate groups and which is capable to render the polyurethane prepolymer dispersible in aqueous medium either directly or after the reaction with a neutralizing agent to provide a salt, at least one ethylenically unsaturated compound (Biv) containing essentially one reactive group capable to react with isocyanate groups, and, optionally, one or more polyol (Bvi) and/or one or more active hydrogen-containing chain extender (Bvii).

By ethylenically unsaturated groups is meant to designate in the present invention carbon-carbon double bonds which under the influence of irradiation and/or a (photo)initiator can undergo radical polymerization. The polymerizable ethylenically unsaturated groups are generally chosen from (meth)acrylic groups, preferably acrylic groups. In the present invention, the term "(meth)acryl' is to be understood as to encompass both acryl and methacryl compounds or derivatives as well as mixtures thereof. The ethylenically unsaturated polyurethane (A), respectively (B), are preferably (meth) acrylated, more preferably acrylated polyurethanes.

The molecular weight of the polyurethane is generally measured by gel permeation chromatography (GPC). A small portion of the polyurethane sample is dissolved in a suitable solvent such as tetrahydrofuran (THF), dimethylformamide (DMF), dimethylacetamide (DMAC) or dimethylsulfoxide (DMSO) and injected in the column after a preliminary filtration. The components of the sample are eluted through a combination of columns using the mobile phase solvent at a specific flow rate (ml/min) and temperature. Narrow polydispersity polystyrene standards of known molecular weight are used for calibration purpose.

By high molecular weight ethylenically unsaturated polyurethane (A) is generally meant to understand in the present invention a polyurethane having a weight average molecular weight MW of more than 100000 Dalton, as measured by GPC using DMAC with 0.02 M LiBr as solvent, at a flow rate of 0.4 ml/min, column set of three Shodex Asahipak polyvinyl alcohol support, 7.5 ID×300 mm columns including pore size GF-310HQ, GF-510HQ and GF-710HQ, column temperature of 60° C. A Differential Refractive Index detector held at 50° C. is used with a ten point polystyrene standard calibration from 580 to 7500000 Dalton (Polymer Laboratories EasiCal Set PS-1) with a third order polynomial fit.

By low molecular weight ethylenically unsaturated polyurethane (B) is generally meant to understand in the present invention a polyurethane having a weight average molecular weight of at most 100000, preferably of at most 20000, Dalton, as measured by GPC using THF as solvent, at a flow rate of 1 ml/min, column set of three Polymer Laboratories gel 5 µm, Mixed D LS (polysturene divinyl benzene copolymer), 7.5 ID×300 mm and a column temperature of 40° C. A Refractive Index detector held at 40° C. is used with an eleven points polystyrene standard calibration from 162 to 377400 Dalton (Polymer Laboratories EasiCal Set PS-2) with a third order polynomial fit.

The molecular weight of polyurethane (A) generally is at least 1000, preferably at least 2000, more preferably at least 7500, Dalton.

The polyurethane (B) used in the composition according to the invention is preferably characterized by a high level of polymerisable ethylenically unsaturated groups; the polyurethane (B) generally contains at least 3 meq of polymerisable ethylenically unsaturated groups per total weight in g of polyurethane (B).

The amount of ethylenically unsaturated groups is usually measured by nuclear magnetic resonance spectroscopy and is expressed in meq per g of solid material. A sample of the composition is dried for 1 day at room temperature and 12 h at 60° C. and then dissolved in N-methylpyrrolidinone. The sample is submitted to 1H-NMR analysis in order to measure the molar concentration of ethylenically unsaturated groups using 1,3,5-bromobenzene as internal standard. The comparison between the peak assigned to aromatic protons of the internal standard and the peaks assigned to the ethylenically unsaturated double bonds allow to calculate the molar concentration of ethylenically unsaturated groups according to the formula (A×B)/C wherein A is the integration of 1H double bonds provided by the sample, B is the number of moles of the internal standard in the sample and C is the integration of 1H provided by the internal standard. Alternatively, the amount of ethylenically unsaturated groups can also be measured by a titration method following the addition of an excess of pyridinium sulfate dibromide on said unsaturated groups (within glacial acetic acid as solvent and mercury acetate as catalyst). Said excess liberates iodine in the presence of potassium iodide and the iodine is then titrated with sodium thiosulfate.

Preferably the number of polymerisable ethylenically unsaturated groups of polyurethane (B) is at least 3.5 meq, more preferably at least 5 meq, of polymerisable ethylenically unsaturated groups per total weight in g of polyurethane (B).

Preferably the number of polymerisable ethylenically unsaturated groups does not exceed 10 meq of polymerisable ethylenically unsaturated groups per total weight in g of polyurethane (B).

The polyurethane (A) used in the composition according to the invention generally contains at least 0.5 meq of polymerisable ethylenically unsaturated groups per total weight in g of polyurethane (A). Preferably the number of polymerisable ethylenically unsaturated groups of polyurethane (A) is at least 1 meq, especially at least 1.5 meq of polymerisable ethylenically unsaturated groups per total weight in g of polyurethane (A). Generally the number of polymerisable ethylenically unsaturated groups does not exceed 5 meq, preferably 3 meq, of polymerisable ethylenically unsaturated groups per total weight in g of polyurethane (A).

The polyurethane (A) preferably has a gel content or non soluble part in THF at 25° C. of at least 50% by weight, more preferably of at least 75%. The gel content is determined as follows: a series of 3 stainless steel sieve ribbons (12×40 mm) fitted with a suspending hook are dipped in the polymer dispersion. The wet sieve is dried for 4 hours at 60° C. and then cooled to room temperature. The dry coated sieve is then soaked in a tube filled with tetrahydrofuran (THF) for 24 h at room temperature in at least 50 ml of the chosen solvent. The sieve is then removed from the solvent and drained for 15 min, taking care that the swollen polymer does not touch the walls of the tube. The residue on the sieve is then dried for 2 hours at 120° C. in a ventilated oven and again weighed to provide the gel content expressed as the percentage of the insoluble material. The average value of the 3 sieves is reported.

The aqueous radiation curable composition according to the invention preferably presents a minimum film formation temperature of at most 40° C., most preferably of at most 20° C. The minimum film formation temperature is measured after application of the polymer dispersion on a gradient-heated metallic bar according to the standard method ISO 2115: 1996.

The polyurethane (A) preferably presents a minimum film formation temperature higher than 20° C., more preferably of at least 50° C., most preferably of at least 70° C. In general, the film formation temperature does not exceed 100° C.

The polyurethane (B) preferably presents a minimum film formation temperature of at most 20° C., more preferably of at most 10° C. In general, the film formation temperature is at least 0° C.

The polyurethane (A) is preferably obtained by a process comprising
  a first step comprising the reaction of compounds (Ai), (Aii), (Aiii) and, optionally compound (Avi) in order to form a polyurethane prepolymer,
  an optional second step comprising the reaction with a neutralizing agent in order to convert the hydrophilic groups provided by compound (Aiii) into anionic salts,
  a step comprising the dispersion in an aqueous medium of the polyurethane prepolymer obtained after the first or second step,
  a step wherein the ethylenically unsaturated polyurethane prepolymer is reacted with at least one active hydrogen-containing chain extender (Avii).

This process can be carried out by reacting a stoechiometric excess of compound (Ai) with compounds (Aii), (Aiii) and optionally (Avi), preferably under substantially anhydrous conditions and at a temperature between 30° C. and 130° C., more preferably between 50° C. and 100° C., until the reaction between the isocyanate groups and the isocyanate-reactive groups is substantially complete. The isocyanate content can be followed by titration with an amine. The reactants are generally used in proportions corresponding to an equivalent ratio of isocyanate groups provided by compound (Ai) to isocyanate-reactive groups provided by compounds (Aii), (Aiii) and optionally compound (Avi), of from about 1.1:1 to about 2:1, preferably from about 1.3:1 to 1.9:1. The reaction may be facilitated by the addition of 5 to 50%, preferably 15 to 30%, by weight of a solvent in order to reduce the viscosity of the prepolymer. The solvent is preferably acetone or methylethylketone. During this process, it is common to use catalysts to accelerate the reaction of the isocyanates towards hydroxyls and to use inhibitors in order to prevent the radical reaction of the reactive unsaturations. It is possible in the frame of this invention to use a sequential process during which compound (Ai) and/or compounds (Aii), (Aiii) and/or (Aiv) are added incrementally in two or several portions, or with a continuous feed. The reason for this is a better control on the exothermicity of the reaction, especially when no solvent is present.

The compounds (Aii) and (Aiii) are preferably used in a molar ratio (ii):(iii) of 1:1 to 3:1, more preferably from 1.5:1 to 2.5:1.

When a compound (Avi) is used, the compounds (Aii), (Aiii) and (Avi) are preferably used in a molar ratio [(Aii)+(Aiii)]:(Avi) of 1:1 to 3:1, more preferably from 1.5 to 2.5:1. Preferably no compound (Avi) is used.

In general, the prepolymer obtained after the reaction of (Ai), (Aii), and (Aiii) and, optionally (Avi), is dispersed in an aqueous medium by adding the prepolymer slowly into water or reversely by adding water to the prepolymer. Usually this dispersion proceeds under high sheer mixing. Usually the dispersion requires the preliminary neutralization of the hydrophilic groups provided by compound (Aiii), such as the carboxylic acid or sulfonic acid groups, into salts. This is generally done by adding an organic or inorganic neutralizing agent, or mixtures thereof, to the prepolymer or the water. Suitable neutralizing agents include volatile organic tertiary amines such as trimethylamine, triethylamine, triisopropylamine, tributylamine, N,N-dimethylcyclohexylamine, N,N-dimethylaniline, N-methylmorpholine, N-methylpiperazine, N-methylpyrrolidine and N-methylpiperidine and non-volatile inorganic bases comprising monovalent metal cations, preferably alkali metals such as lithium, sodium and potassium and anions such as hydroxides, hydrides, carbonates and bicarbonates that do not remain in the dispersion as such.

The total amount of these neutralizing agents can be calculated according to the total amount of acid groups to be neutralized. Generally a stoechiometric ratio of about 1:1 is used.

The isocyanate functional prepolymer fraction is chain-extended with the active hydrogen-containing chain extender (Avii), generally in the aqueous phase, preferably at a temperature between 5 and 90° C., more preferably of 15 to 30° C. and most preferably of 15 to 20° C. The total amount of active hydrogen containing chain extender (Avii) used is generally calculated according to the amount of residual isocyanate groups present in the polyurethane prepolymer. The equivalent ratio of isocyanate groups in the prepolymer to the active hydrogen groups in the chain extender (Avii) during the chain extension is generally in the range of from about 1:0.7 to about 1:1.3, preferably from about 1:0.9 to about 1:1 on an equivalent basis. This ratio is more preferably 1:1 in order to obtain a fully reacted polyurethane polymer with no residual free isocyanate groups.

In general, after the formation of the dispersion of the polyurethane and when it contains a volatile solvent with a boiling point of below 100° C., the polymer dispersion is stripped. This is usually done under reduced pressure and at a temperature between 20 and 90° C., preferably 40 to 60° C.

The polyurethane (B) is preferably obtained by a process comprising
- a first step comprising the reaction of compounds (Bi), (Bii), (Biii) and, optionally compound (Bvi),
- a second step wherein the prepolymer obtained after the first step is reacted with at least one ethylenically unsaturated compound (Biv) containing essentially one reactive group capable to react with an isocyanate group,
- an optional third step comprising the reaction with a neutralizing agent in order to convert the hydrophilic groups provided by compound (Biii) into salts,
- a forth step comprising the dispersion in an aqueous medium of the polyurethane prepolymer obtained after the second or third step,
- an optional step wherein the ethylenically unsaturated polyurethane is reacted with at least one active hydrogen containing chain extender (Bvii).

This process can be carried out by reacting a stoechiometric excess of compound (Bi) with compounds (Bii), (Biii) and optionally (Bvi), preferably under substantially anhydrous conditions and at a temperature between 30° C. and 130° C., more preferably between 50° C. and 100° C., until the reaction between the isocyanate groups and the isocyanate-reactive groups is substantially complete. The isocyanate content can be followed by titration with an amine. The reactants are generally used in proportions corresponding to an equivalent ratio of isocyanate groups provided by compound (Bi) to isocyanate-reactive groups provided by compounds (Bii), (Biii) and optionally compound (Bvi), of from about 1.05:1 to about 2:1, preferably from about 1.3:1 to 1.9:1. The reaction may be facilitated by the addition of solvent, catalysts and inhibitors such as described for polyurethane (A).

The compounds (Bii) and (Biii) are preferably used in a molar ratio (ii):(iii) of 0.5:1 to 1.5:1, more preferably from 08:1 to 1.2:1.

When a compound (Bvi) is used, the compounds (Bii), (Biii) and (Bvi) are preferably used in a molar ratio [(Bii)+ (Biii)]:(Bvi) of 0.5:1 to 1.5:1, more preferably from 0.8:1 to 1.2:1. Preferably no compound (Bvi) is used.

In the subsequent step, the isocyanate-terminated polyurethane prepolymer is reacted with compound (Biv), preferably in the same conditions as for the previous step. The reactants are generally used in proportions corresponding to an equivalent ratio of isocyanate groups provided by the prepolymer obtained in the first step to isocyanate-reactive groups provided by compound (Biv) of from about 2:1 to 1:1, preferably from about 1.7:1 to 1.25:1. The isocyanate content can be followed by titration with an amine.

In general, the prepolymer obtained after the reaction of (Bi), (Bii), (Biii), and (Biv) and, optionally (Bvi), is dispersed in an aqueous medium by adding the prepolymer slowly into water or reversely by adding water to the prepolymer. Usually this dispersion proceeds under high sheer mixing. Usually the dispersion requires the preliminary neutralization of the hydrophilic groups provided by compound (Biii) into salts. This is generally done such as described for the preparation of polyurethane (A) here above.

In general, the relative quantities of compounds (Bi), (Bii), (Biii), (Biv) and optional compound (Bvi), are such that a stoechiometric excess of compound (Bi) to compounds (Bii), (Biii), (Biv) and (By) is used so that a fraction of isocyanate functional ethylenically unsaturated polyurethane prepolymer is obtained, that is a prepolymer comprising residual isocyanate groups. This isocyanate functional prepolymer fraction can chain-extended with the active hydrogen-containing chain extender (Bvii) such as described for the preparation of prepolymer (A). Preferably no chain extender (Bvii) is used. If no chain extender is used, residual isocyanate groups usually react with water during the dispersion step, generally forming an amine which can then further react and provide chain extension.

In general, after the formation of the dispersion of the prepolymer and when it contains a volatile solvent with a boiling point of below 100° C., the polymer dispersion is stripped. This is usually done under reduced pressure and at a temperature between 20 and 90° C., preferably 40 to 60° C.

By polyisocyanate compounds (Ai) and (Bi) are meant to designate organic compounds comprising at least two isocyanate groups. The polyisocyanate compound usually comprises not more than three isocyanate groups. The polyisocyanate compound is most preferably a diisocyanate.

The polyisocyanate compound is generally selected from aliphatic, cycloaliphatic, aromatic and/or heterocyclic polyisocyanates or combinations thereof.

Examples of aliphatic and cycloaliphatic polyisocyanates are 1,6-diisocyanatohexane (HDI), 1,1'-methylene bis[4-isocyanatocyclohexane] (H12MDI), 5-isocyanato-1-isocyanatomethyl-1,3,3-trimethylcyclohexane (isophorone diisocyanate, IPDI). Aliphatic polyisocyanates containing more than two isocyanate groups are for example the derivatives of above mentioned diisocyanates like 1,6-diisocyanatohexane biuret and trimer.

Examples of aromatic polyisocyanates are 1,4-diisocyanatobenzene (BDI), 2,4-diisocyanatotoluene (TDI), 1,1'-methylenebis[4-isocyanatobenzene] (MDI), xylilene diisocyanate (XDI), tetramethylxylilene diisocyanate (TMXDI), 1,5- naphtalene diisocyanate (NDI), tolidine diisocyanate (TODI) and p-phenylene diisocyanate (PPDI). The polyisocyanate is preferably selected from aliphatic and cycloaliphatic polyisocyanates. Especially preferred is 1,1'-methylene bis[4-isocyanatocyclohexane]. In the composition according to the invention, polyisocyanate compounds (Ai) and (Bi) may be the same or different.

The amount of polyisocyanate compound (Ai) used for the synthesis of the polyurethane (A) is generally in the range of from 10 to 60 wt % of the polyurethane (A), preferably from 30 to 60 wt % and more preferably from 40 to 50 wt %.

The amount of polyisocyanate compound (Bi) used for the synthesis of the polyurethane (B) is generally in the range of from 10 to 60 wt % of the polyurethane (B), preferably from 10 to 40 wt % and more preferably from 20 to 30 wt %.

By ethylenically unsaturated compounds (Aii) and (Bii) containing at least two reactive groups capable to react with isocyanate groups are meant to designate in the present invention compounds comprising at least one unsaturated function such as (meth)acrylic group and at least two nucleophilic functions capable of reacting with isocyanate, preferably hydroxyl functions.

Preferred are (meth)acryloyl dihydroxy compounds and poly(meth)acryloyl dihydroxy compounds. Compounds comprising two hydroxyl functions and at least two (meth)acrylate functions are preferred. Acrylates are particularly preferred.

Particularly preferred compounds are those obtained from the reaction of diglycidyl compounds with (meth)acrylic acid.

Aliphatic diglycidyl compounds derived from alpha, omega diols having 4 to 12 carbon atoms or from polyoxyalkylenediols, especially polyethylene glycol, polypropylene glycol or mixtures thereof that contain oxyalkylene groups, can be used. Preference is given, for example, to 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether and hydrogenated bisphenol A diglycidyl ether and hydrogenated bisphenol F diglycidyl ether and their ethoxylated and/or propoxylated equivalents. It is also possible to employ diglycidyl esters, such as diglycidyl hexahydrophthalate.

Aromatic diglycidyl compounds derived from bisphenol A and bisphenol F are preferred. Particularly preferred are bisphenol A diglycidyl ether, bisphenol F diglycidyl ether and their ethoxylated and/or propoxylated equivalents. It is also possible to employ diglycidyl esters, such as diglycidyl phthalate, N,N-diglycidyl aniline, N,N-diglycidyl-4-glycidyloxyaniline. Especially preferred is the diacrylate ester of bisphenol A diglycidylether.

Compounds obtained from partial esterification of aliphatic or aromatic polyhydric polyols with (meth)acrylic acid and having a residual average hydroxyl functionality of at least 2.0 in the molecule, can also be used. In this context, it is also possible to use the reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. Preferred are those alkoxylated polyols having not more than two alkoxy groups per hydroxyl functionality and ε-caprolactone-modified polyols.

In the composition according to the invention, compounds (Aii) and (Bii) may be the same or different.

The amount of compound (Aii) generally is from 5 to 50% by weight of the polyurethane (A), preferably of from 20 to 40% by weight.

The amount of compound (Bii) generally is from 5 to 30% by weight of the polyurethane (B), preferably of from 10 to 20% by weight.

The hydrophilic compounds (Aiii) and (Biii) are generally selected from polyols comprising a functional group that can exhibit an ionic or non-ionic hydrophilic nature.

Preferably it is a polyol containing one or more anionic salt groups, such as a carboxylate and sulfonate salt groups or acid groups which may be converted to an anionic salt group, such as carboxylic acid or sulfonic acid groups. Preferred are hydroxycarboxylic acids represented by the general formula $(HO)_xR(COOH)_y$, wherein R represents a straight or branched hydrocarbon residue having 1 to 12 carbon atoms, and x and y independently are integers from 1 to 3. Examples of these hydroxycarboxylic acids include citric acid, malic acid, lactic acid and tartaric acid. The most preferred hydroxycarboxylic acids are the α,α-dimethylolalkanoic acids, wherein x=2 and y=1 in the above general formula, such as for example, 2,2-dimethylolpropionic acid and 2,2-dimethylolbutanoic acid.

In the composition according to the invention, compounds (Aiii) and (Biii) may be the same or different.

The amount hydrophilic compound A(iii) generally is from 1 to 20% by weight of the polyurethane (A), preferably of from 3 to 10% by weight.

The amount hydrophilic compound (Biii) generally is from 1 to 20% by weight of the polyurethane (B), preferably of from 3 to 10% by weight.

By ethylenically unsaturated compound (Biv) containing essentially one reactive group capable to react with isocyanate groups is meant to designate in the present invention compounds comprising at least one unsaturated function such as (meth)acrylic group and one nucleophilic function capable of reacting with isocyanate, preferably an hydroxyl group. Preferred are (meth)acryloyl mono-hydroxy compounds, more particularly poly(meth)acryloyl mono-hydroxy compounds. Acrylates are particularly preferred.

Useful compounds (Biv) include the esterification products of aliphatic and aromatic polyols with (meth)acrylic acid having a residual average hydroxyl functionality of about 1. The partial esterification products of (meth)acrylic acid with tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. These modified or unmodified polyols are partly esterified with acrylic acid, methacrylic acid or mixtures thereof until the desired residual hydroxyl functionality is reached. Alternatively these products can be obtained by transesterification of the polyols with (meth)acrylic esters. Suitable compounds are the (meth)acrylic esters with linear and branched polyols in which at least one hydroxy functionality remains free, like hydroxyalkyl(meth)acrylates having 1 to 20 carbon atoms in the alkyl group. Preferred molecules in this category are hydroxyethyl (meth)acrylate, hydroxypropyl (meth)acrylate, hydroxybutyl (meth)acrylate. Particularly preferred are compounds comprising at least two (meth)acryl functions such as glycerol diacrylate, trimethylolpropane diacrylate, pentaerythritol triacrylate, ditrimethylolpropane triacrylate, dipentaerythritol pentaacrylate and their (poly)ethoxylated and/or (poly)propoxylated equivalents.

The amount of compound (Biv) generally is from 10 to 70% by weight of the polyurethane (B), preferably of from 40 to 60% by weight.

Polyols (Avi) and (Bvi) optionally used in the preparation of the polyurethanes (A) and (B) may be high molecular weight polyols having a number average molecular weight of at least 400, or low molecular weights polyols having a molecular weight lower than 400 or any combinations or mixtures thereof. High molecular weight polyols preferably have a number average molecular weight which does not exceed 5000, more preferably not 1000.

Examples of low molecular weight polyols are ethyleneglycol, diethyleneglycol, propyleneglycol, dipropyleneglycol, neopentyl glycol, 1,3-propane diol, 1,3-butanediol, 1,4-butanediol, 1,5-pentanediol, 1,6-hexanediol, 1,7-heptanediol, 1,8-octanediol, 2-ethyl-1,6-hexanediol, cyclohexane dimethanol, trimethylolpropane, di-trimethylol propane, glycerol, pentaerythritol and di-pentaerythritol.

Examples of high molecular weight polyols are polyester polyols, polyether polyols, polycarbonate polyols and polyacrylate polyols, as well as combinations thereof. Particularly preferred are polyester polyols, especially those made from the polycondensation of neopentylglycol and adipic acid and/or isophthalic acid. When used, the total amount of polyol (Avi) in the polyurethane (A) is usually of from 5 to 30% by weight of the polyurethane (A), preferably of from 10 to 20% by weight. When used, the total amount of polyol (Bvi) in the polyurethane (B) is usually of from 5 to 30% by weight of the polyurethane (B), preferably of from 5 to 10% by weight. Active hydrogen containing chain-extender (Avii) preferably comprises one or more active amino groups capable of making a chain extension of the remaining isocyanate end-groups of the prepolymer. The chain extender is preferably a polyamine, more preferably a water-soluble aliphatic, alicyclic, aromatic or heterocyclic primary or secondary polyamine or hydrazine, having up to 60, preferably up to 12 carbon atoms. The polyamine used has preferably an average functionality of 2 to 4, more preferably 2 to 3. Examples of such chain extenders (Avii) useful herein comprise hydrazine, 1,2-ethylenediamine, 1,4-butanediamine, 1,6-hexanediamine, 2-methyl-1,5-pentanediamine, 1,8-octanediamine, 1,10-decanediamine, 1,12-dodecanediamine, piperazine, isophorone diamine, meta xylilenediamine, polyethylene amines, polyoxyethylene amines and polyoxypropylene amines (e.g. Jeffamines from TEXACO), as well as mixtures thereof.

The amount of compound (Avii) generally is from 5 to 20% by weight of the polyurethane (A), preferably of from 5 to 10% by weight.

If used, the active hydrogen containing chain extender (Bvii) can be selected from those described for compound (Avii). If used, the amount of compound (Bvii) generally is from 1 to 10% by weight of the polyurethane (B), preferably of from 1 to 5% by weight.

The compositions according to the invention generally comprise from 10 to 90% by weight of polyurethane (A) per total weight of polyurethane (A) and polyurethane (B). The compositions preferably comprise from 30 to 70%, more preferably from 40 to 60%, by weight of polyurethane (A) per total weight of polyurethane (A) and polyurethane (B).

The compositions according to the invention generally comprise 10 to 90%, preferably from 30 to 70%, more preferably from 40 to 60%, by weight of polyurethane (B) per total weight of polyurethane (A) and polyurethane (B).

The compositions according to the invention may be prepared by any suitable way. For example they may be prepared by adding polyurethane (A), preferably as aqueous composition, into an aqueous composition comprising polyurethane (B), or vice versa. This addition is preferably done under low shear mixing. Alternatively, the compositions may be prepared in situ by mixing polyurethane prepolymer (A) and/or prepolymer (B) before neutralization, chain extension and/or dispersion in water.

The composition according to the invention may comprise one or more ethylenically unsaturated compound (C) different from polyurethanes (A) and (B), that is a compound comprising at least one unsaturated function such as an acrylic, methacrylic or allylic group, more particularly a (poly)(meth)acryloyl-containing compound. Acrylates are preferred.

The ethylenically unsaturated compound (C) can be selected from the ethylenically unsaturated compounds (Bii) and (Biv) as described here above or can be an ethylenically unsaturated compound which comprises no functionality which is capable to react with an isocyanate group.

The compound (C) is preferably selected from ethylenically unsaturated compounds comprising no functionality which is capable to react with an isocyanate group. Aliphatic and aromatic polyhydric polyols which have been totally esterified with (meth)acrylic acid and contain substantially no residual hydroxyl functionality in the molecule are particularly preferred. Suitable are the esterification products of (meth)acrylic acid with tri-, tetra-, penta- and/or hexahydric polyols and mixtures thereof. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. Compounds employed with preference are alkoxylated polyols having no more than two alkoxy groups per hydroxyl functionality, and ε-caprolactone-modified polyols. These modified or unmodified polyols are preferably totally esterified with acrylic acid, methacrylic acid or mixtures thereof until low residual hydroxyl functionality remains. Examples of poly-unsaturated compounds from this category are trimethylolpropane triacrylate, glycerol triacrylate, pentaerythritol tetraacrylate, di-trimethylolpropane tetraacrylate, di-pentaerythritol hexaacrylate and their (poly) ethoxylated and/or (poly)propoxylated equivalents, as well as mixtures thereof. It is also possible to use any compound from the category of urethane(meth)acrylates, epoxy(meth)acrylates, polyester(meth)acrylates and (meth)acrylic(meth)acrylates or mixtures thereof.

When used, the amount of ethylenically unsaturated compound (C) used is generally between 1 and 50% by weight, preferably between 5 and 50% by weight and more preferably between 10 and 30% by weight, relative to the total amount of polyurethane (A) and polyurethane (B).

The addition of the ethylenically unsaturated compound (C) can be done after the preparation of polyurethanes (A) and/or (B) or can be done during the synthesis of one or both of these polyurethanes (A) and (B).

The composition according to the invention may also comprise one or more coalescing solvent (D), that is a high boiling point solvent capable to serve as coalescence aid during the film formation of the composition. Useful coalescing solvents include oxygenated solvents, preferably selected from (i) the fully and partially reacted alkyl or aryl esters of aromatic, aliphatic or cycloaliphatic polycarboxylic acids (ii) the fully and partially reacted alkyl or aryl esters of aromatic, aliphatic or cycloaliphatic polyglycols (iii) the fully and partially reacted alkyl or aryl ethers of aromatic, aliphatic or cycloaliphatic polyglycols (iv) the fully and partially reacted mixed alkyl and aryl esters and ethers of mixed aromatic, aliphatic or cycloaliphatic polyglycol-carboxylates (v) the neat, the alkyl and aryl substituted cyclic carbonates (vi) the neat, the alkyl and aryl substituted cyclic ethers (vii) the neat, the alkyl and aryl substituted cyclic esters (vii) the neat, the alkyl and aryl substituted cyclic anhydrides. The coalescing solvents that are suitable to be used in the frame of our invention are including not imitatively the dimethyl esters or diisobutyl esters of adipic, glutaric, succinic or phtalic acids and their blends, the ethyl-3-ethoxypropionate (Ektapro EEP, Eastman), the 2,2,4-trimethyl-1,3-pentanedioldiisobutirate (Kodaflex TXBI, Eastman), ethylene carbonate and propylene carbonate, propyleneglycol diacetate (DOWANOL PGDA), dipropylene glycol dimethyl ether (PROGLYDE DMM). The coalescing solvents can be used in an amount of 5 to 50 wt %, preferably 10 to 25 wt %, expressed on the dry polymer to ensure the good film formation and fast hardness. The compositions according to the present invention preferably do not contain a coalescing solvent.

The composition and process according to the present invention are advantageous in that they are able to provide dispersions with low volatile organic content (VOC), a high solids content, a low viscosity, a low particle size, an excellent stability and a low film formation temperature.

The aqueous dispersions of the invention generally have a total solids content of from about 30 to 60 wt %, preferably from about 35 to 40 wt %; a viscosity measured at 25° C. of 20 to 20000 mPa s, preferably 50 to 500 mPa s, a pH value of 6 to 11, preferably of 7 to 8.5, an average particle size of about 10 to 300 nm, preferably 50 to 100 nm. The minimum film formation temperature preferably ranges from 0 to 40° C., more preferably from 10 to 20° C.

The composition according to the present invention is able to provide coatings having no tack even before radiation curing.

The radiation-curable compositions according to the present invention are preferably cured by ultraviolet irradiation, generally in the presence of photoinitiator. They can also be cured by electron-beam irradiation, allowing the use of compositions free of photoinitiator.

The radiation-curable compositions according to the present invention may also be subject to additional crosslinking reactions due to the presence of reactive functions present in the polyurethane (A), the polyurethane (B) and/or in external compounds, including oligomers and polymers. Suitable reactive functions include, isocyanate, blocked isocyanate, aziridine, carbodiimide, alkoxysilane, acetoacetoxy, carbonyl and epoxy groups. Suitable external crosslinkers are (blocked) polyisocyanates, polyaziridines, polycarbodiimides, metal salts like zirconium ammonium carbonate, polyepoxydes and polyalkoxysilanes.

The compositions according to the invention provide deep cure performances in the bulk of a pigmented coating where UV light cannot penetrate easily.

The compositions according to the invention are providing extremely rapid curing.

The compositions according to the invention show an higher reactivity allowing higher line speed or less irradiative energy curing and increased productivity.

The compositions according to the invention permit to obtain coatings, especially pigmented coatings, which after radiation curing show an excellent chemical resistance against water, solvents and stains, a superior mechanical resistance against scratch and abrasion—while still being relatively flexible at ambient or low temperature. These coatings also exhibit a good adhesion on porous and non-porous substrates.

The coatings obtained from the compositions according to the invention result in selective mechanical properties (harder and softer) and polymer polarity (more hydrophilic or hydrophobic) that allow to cover many different application areas as, for example, coatings for wood, plastic, glass, metal and concrete. The compositions according to the invention are suitable for making inks and overprint varnishes, as well as coatings. They are especially suitable for making coatings, more particularly color pigmented coatings, especially coatings for wood furniture.

The present invention therefore also relates to the use of the compositions for making inks, varnishes or coatings and to a process for making inks, varnishes or coatings wherein a composition as described here above is used. The present invention also relates to process for preparing a coated article comprising a step wherein the article is coated with a radiation curable composition according to the invention. In this process additional external crosslinkers, such as (blocked) polyisocyanates, polyaziridines, polycarbodiimides, metal salts like zirconium ammonium carbonate, polyepoxydes and polyalkoxysilanes, may be added to the radiation curable composition according to the invention as described here above.

In particular, 3-dimensional objects where some parts could be less or even not irradiated are particularly in the frame of the invention.

The examples which will follow illustrate the invention without limiting it.

Polyurethane A1: A double-wall glass reactor equipped with a mechanical stirrer, a thermocouple, a vapor condenser and a dropping funnel was charged with 617.0 g of 1,1'-methylene bis(4-isocyanato cyclohexane)(H12MDI), 459.6 g of the acrylic acid adduct of bisphenol A diglycidyl ether (BPAAA), 48.5 g of dimethylol propionic acid (DMPA), 0.4 g of 4-methoxyphenol (MEHQ), 0.4 g of 2,6-di-t-butyl-4-methoxyphenol (BHT), 0.2 g of dibutyltinlaurate (DBTL) and 375 g of acetone. The reaction mixture was heated to 60° C. under stirring and kept under reflux until the isocyanate content reached a value of 1.39 meg/g. This mixture was then cooled down to 50° C. and 32.9 g of triethylamine TEA (0.9 eq) was added under stirring. The resulting mixture was then added slowly to 2334 g of water at room temperature under high shear agitation until a stable dispersion was obtained. Immediately afterwards, 128.7 g of meta-xylylene diamine (MXDA) was incrementally added to the dispersion under water cooling so that the temperature did not exceed 25° C. The acetone was stripped off under vacuum at a temperature of 50° C. until its level was below 0.15%. The polymer dispersion was then cooled down below 30° C. and its solid content was adjusted to 35% by adding water. The final product was filtered over a 100µ sieve. The characteristics of the dispersion are indicated in Table 3 hereunder. The solid content was measured by gravimetric method during 2 h at 120° C. The viscosity of the dispersion was measured at 25° C. with a Brookfield viscometer using spindle N° 1 at 50 rpm. The average particle size of the aqueous polymer dispersion was measured by laser light scattering using a Malvern Autosizer Particle Analyzer. The grits content of the dispersion, that is the amount of residue from the polymer dispersion filtered on a 50µ sieve, was measured by gravimetry. The minimum film formation temperature (MFFT) of the dispersion measured on an automatic gradient-heated metal plate as described here above. The MW was measured by GPC as described herein.

The colloidal stability was assessed by observing the decantation and/or phase separation on a 50 g sample placed in an oven at 60° C. for a recorded number of days. The dispersion contained less than 100 mg/l of grits and showed stability at 60° C. of more than 10 days.

The other characteristics of the dispersion are described in Table 3 hereunder.

Polyurethane B1: A reactor such as described here above was charged with 526.0 g of H12MDI, 270.5 g of BPAAA, 93.3 g of DMPA, 0.5 g of MEHQ, 0.5 g of BHT, 0.2 g of DBTL and 652 g of acetone. The reaction mixture was heated to 60° C. under stirring and kept under reflux until the isocyanate content reached a value of 1.18 meg/g. 1066.5 g of a reaction mixture of dipentaerythrytol tetraacrylate, dipentaerythrytol pentaacrylate and dipentaerythrytol hexaacrylate (DPHA) having an hydroxyl number of 138 mg KOH/g was added slowly to the reactor and kept under reflux until the isocyanate content reached a value of 0.11 meq/g. This mixture was then cooled down to 50° C. and 70.3 g of triethylamine (1 eq) was added under stirring. The resulting mixture was then added slowly to 3638 g of water at room temperature under high shear agitation until a stable dispersion was obtained. The acetone was stripped off under vacuum at a temperature of 50° C. until its level was below 0.15%. The polymer dispersion was then cooled down below 30° C. and its solid content was adjusted to 35% by adding water. The final product was filtered over a 100µ sieve.

The dispersion contained less than 100 mg/l of grits and was stable at 60° C. for more than 10 days.

The other characteristics of the dispersion are indicated in Table 3 hereunder.

Polyurethanes A2 to A7 and B2 to B4, respectively, were obtained as described here above for, respectively, A1 and B1 except that the quantities and nature of the different reactants as described in tables 1 and 2 were used.

Polyurethanes A2 to A5 and B2 contained an additional polyol (PAINPG). This polyol was added together with BPAAA. PAING is a polyester polyol having an average molecular weight of about 635 and was obtained from the polycondensation of a 1:1 mixture of adipic and isophtalic acid with neopentylglycol.

In Polymers A7 and B4 H12MDI was replaced with IPDI.

In Polymer A3, 148.9 g of aliphatic urethaneacrylate EBECRYL® 1290 was added to the prepolymer before its neutralization and dispersion in water.

All dispersions contained less than 100 mg/l of grits and had a stability at 60° C. of more than 10 days. The other properties of these polyurethanes are described in Table 3

TABLE 1

| Polymer | H12MDI (g) | BPAAA (g) | DMPA (g) | TEA (g) | PAINPG (g) | MXDA (g) |
|---|---|---|---|---|---|---|
| A2 | 369.1 | 212.0 | 29.9 | 20.3 | 138.8 | 65.0 |
| A3 | 300.3 | 160.8 | 29.0 | 20.7 | 105.3 | 56.9 |
| A4 | 393.9 | 197.0 | 30.1 | 20.2 | 129.0 | 77.8 |
| A5 | 341.6 | 228.8 | 29.8 | 20.2 | 149.8 | 47.0 |
| A6 | 385.7 | 333.0 | 31.3 | 21.3 | — | 71.2 |
| A7 | IPDI 155.6 | 136.8 | 17.4 | 11.8 | — | 35.2 |

TABLE 2

| Polymer | H12MDI (g) | BPAAA (g) | DMPA (g) | TEA (g) | DPHA (g) | PAINPG (g) |
|---|---|---|---|---|---|---|
| B2 | 281.4 | 132.8 | 41.7 | 31.6 | 631.8 | 55.1 |
| B3 | 395.8 | 245.7 | 58.5 | 44.4 | 730.0 | — |
| B4 | IPDI 80.9 | 59.3 | 14.1 | 10.6 | 191.1 | — |

TABLE 3

| Polyurethane | solids (%) | Viscosity (mPa·s) | pH | Particle size (nm) | MFFT (° C.) | MW* (Dalton) |
|---|---|---|---|---|---|---|
| A1 | 35 | 38 | 8.2 | 82 | 90 | 656000 |
| A2 | 35 | 38 | 8.2 | 81 | 73 | 320000 |
| A3 | 35 | 27 | 8.1 | 126 | 56 | 240000 |
| A4 | 35 | 34 | 8.1 | 78 | 82 | 319000 |
| A5 | 34.5 | 38 | 8.3 | 72 | 62 | 195000 |
| A6 | 34.5 | 24 | 7.7 | 111 | 78 | 227000 |
| A7 | 35 | 28 | 8.2 | 116 | 80 | 2340000 |
| B1 | 35.6 | 45 | 8 | 55 | 3 | 16000 (Mn: 2500) |
| B2 | 35 | 50 | 7.5 | 80 | 0 | |
| B3 | 35 | 28 | 7.5 | 76 | 5 | 15000 (Mn: 2300) |
| B4 | 35 | 46 | 7.3 | 118 | 0 | 14000 (Mn: 2200) |

*MW: high molecular weight polyurethanes A1 to A7 have been measured by GPC in DMAC at 60° C. - low molecular weight polyurethanes B1 to B4 have been measured by GPC in THF at 40° C.

EXAMPLE 1

A reactor equipped with a mechanical stirrer was charged with 400 g of the polyurethane dispersion A1 as described here above at ambient temperature and 600 g of the polyurethane dispersion B1 as described here above were added slowly and under low shear until a homogeneous mixture was obtained. The MFFT of this mixture was 6° C.

The composition was then formulated with 1.5% of a photo-initiator blend (1% ADDITOL® BCPK+0.5% IRGACURE® DW 819) and 15 wt % of an industrial orange pigment paste used for furniture applications (solid content of 70%, viscosity of 1000 mPa·s and comprising a blend of yellow and orange pigments, white titanium dioxide pigments and stabilizers). The viscosity of the formulated composition was adjusted between 1000 and 1500 mPa·s using about 1.5 wt % of a thickener solution (1:1 mixture of ADDITOL® VXW 6360 and water).

The formulated composition was applied with a wet thickness of 120µ using a Meyer bar or a spray gun on white melamine-laminated MDF panels and dried in an oven at 40° C. for 20 minutes The radiation curing was realized using a Gallium ultra-violet light of 120 W/cm and a Mercury ultra-violet light of 120 W/cm at a conveyer speed of 5 meters per minute. The panels were evaluated for scratch resistance (using nail test, Hamberger Hobel test, pencil hardness test) and stain resistance (using black marker and coffee stains) such as specified here below.

Nail scratch resistance: The test is performed at room temperature by scratching the coating with the nail 2 minutes after the UV curing (still hot) and after 1 hour (ambient temperature). The results are rated visually and recorded in a 1-5 scale: 5=no scratch; 4=very light scratch; 3=moderate scratch; 2=strong scratch; 1=very strong scratch. A high value (5) is expected to provide the best protection against any storehouse or household deterioration.

Hamberger Hobel (HH): The test is performed at room temperature by scratching the coating with the Hamberger Hobel test equipment after 1 hour and 1 day (ambient temperature). The result is expressed in Newton. A high level is expected to provide the best protection against any household deterioration.

Pencil hardness: The test is performed after 1 hour and 1 day at room temperature by scratching the coating with sharp pencils of increasing hardness using a specific piece of metal that defines the angle and the pressure applied. The result is the pencil hardness above which the coating is clearly damaged in the bulk. The hardness scale is used for ranking from soft to hard: 2B-B-HB-F-H-2H-3H-4H-5H-6H-7H-8H-9H. A high hardness is expected to provide the best protection against any storehouse or household deterioration.

Stain, Black marker resistance: The resistance is assessed about 24 hours after curing of the coating. A stain is made with the black marker (alcohol type, Artline TM) and washed after 5 minutes at ambient temperature using a tissue saturated with isopropanol. The results are rated visually and recorded in a 1-5 scale: 5=no stain; 4=very light stain; 3=moderate stain; 2=strong stain; 1=very strong stain. A high value (5) is expected to provide the best protection against any household product spillage. Stain, Coffee resistance: The resistance is assessed about 24 hours after curing of the coating. A solution of 4% Nescafe™ in water at 98° C. is prepared and cooled down to room temperature. A glass micro fiber filter saturated with coffee is put on the coating for 16 hours and then the stain is washed with water. The results are rated visually and recorded in a dual 1-5 scale: 5=no stain; 4=very light stain; 3=moderate stain; 2=strong stain; 1=very strong stain and 5=no deterioration; 4=very light deterioration; 3=moderate deterioration; 2=strong deterioration; 1=very strong deterioration. A high value (5) is expected to provide the best protection against any household product spillage.

The results obtained are presented in Table 5.

EXAMPLES 2 TO 8

Example 1 was reproduced except that the compositions as described in Table 4 with the polyurethanes obtained as described in tables 2 and 3 were used.

TABLE 4

| Example | Polyurethane A | Quantity | Polyurethane B | Quantity | MFFT |
|---|---|---|---|---|---|
| 2 | A2 | 400 g | B2 | 600 g | 5° C. |
| 3 | A2 | 400 g | B3 | 600 g | 7° C. |
| 4 | A3 | 600 g | B2 | 400 g | 8° C. |
| 5 | A4 | 400 g | B3 | 600 g | 11° C. |
| 6 | A5 | 400 g | B3 | 600 g | 16° C. |
| 7 | A6 | 400 g | B3 | 600 g | 8° C. |
| 8 | A7 | 400 g | B4 | 600 g | 1° C. |

COMPARATIVE EXAMPLES 9R AND 10R

Example 1 was reproduced except that, only the polyurethane dispersion A2, respectively B2, was used in stead of the composition comprising both polyurethane A1 and B1.

The results are presented in Table 5

EXAMPLES 11 TO 18 AND COMPARATIVE EXAMPLES 19R AND 20R

Examples 1 to 8 and comparative examples 9R and 10R were reproduced except that the compositions were used in combination with a polyisocyanate 5% Bayhydur® 3100.

The combination had a pot life of maximum 8 hours.

The results are presented in Table 5

TABLE 5

| | Nail 2' (1-5) | Nail 1 h (1-5) | HH 1 h (N) | HH 7 d (N) | Pencil 1 h | Pencil 7 d | Stain black (1-5) | Stain coffee (1-5) |
|---|---|---|---|---|---|---|---|---|
| 1 | 3.5 | 5 | 5 | 6 | H | 2H | 4.5 | 5/4 |
| 2 | 2 | 3 | 4 | 5 | B | F | 3 | 3 |
| 3 | 2 | 4 | 5 | 10 | B | H | 4 | 5/3 |
| 4 | 2 | 3 | 4 | 5 | B | F | 3 | 3 |
| 5 | 2 | 4 | 5 | 6 | HB | H | 3.5 | 4 |
| 6 | 2.5 | 4 | 5 | 6 | HB | H | 4 | 5/5 |
| 7 | 2 | 5 | 6 | 6.5 | F | H | 4 | 5/3 |
| 8 | 3 | 5 | 5 | 5 | F | 2H | 5 | 5/4 |
| 9R | 1 | * | * | * | * | * | 3 | * |
| 10R | 1 | 4 | 5 | 6 | <B | F | 5 | 5/4 |
| 11 | 4 | 5 | 6 | 10 | 2H | 3H | 5 | 5/5 |
| 12 | 3 | 5 | 4 | 7 | B | F | 5 | 5 |
| 13 | 3 | 5 | 6 | 10 | F | 2H | 5 | 5/4 |
| 14 | 3.5 | 5 | 4 | 8.5 | B | F | 4.5 | 5 |
| 15 | 3 | 5 | 7.5 | 9 | HB | H | 5 | 5/5 |
| 16 | 3.5 | 5 | 6.5 | 10 | H | 2H | 5 | 5/4 |
| 17 | 4 | 5 | 12.5 | 14 | 2H | 3H | 5 | 5/5 |
| 18 | 4.5 | 5 | 7 | 11 | 2H | 3H | 5 | 5/4 |
| 19R | 3 | * | * | * | * | * | 3.5 | * |
| 20R | 1 | 5 | 5 | 6 | HB | F | 5 | 5/4 |

*properties were not further measured (MFFT was very high; the incorporation of high amount of coalescing agent would be required to obtain a suitable film)

The comparison of Examples 1 to 8 and 11 to 18 with Comparative example 9R,10R, 19R and 20R show the better performances of the coatings obtained with the compositions according to the invention.

The invention claimed is:
1. An aqueous radiation-curable composition comprising at least one high molecular weight ethylenically unsaturated polyurethane (A) obtained from the reaction of
at least one polyisocyanate compound (Ai),
at least one ethylenically unsaturated compound (Aii) containing at least two reactive groups capable to react with isocyanate groups,
at least one hydrophilic compound (Aiii) containing at least one reactive group capable to react with isocy- anate groups and which is capable to render the polyurethane prepolymer dispersible in aqueous medium either directly or after the reaction with a neutralizing agent to provide a salt, at least one active hydrogen-containing chain extender (Avii) capable to react with isocyanate groups and provide chain extension, and, optionally one or more polyol (Avi), wherein the polyurethane (A) has a weight average molecular weight of more than 100000 Dalton; and at least one low molecular weight ethylenically unsaturated polyurethane (B), different from polyurethane (A), obtained from the reaction of at least one polyisocyanate compound (Bi), at least one ethylenically unsaturated compound (Bii) containing at least two reactive groups capable to react with isocyanate groups, at least one hydrophilic compound (Biii) containing at least one reactive group capable to react with isocyanate groups and which is capable to render the polyurethane prepolymer dispersible in aqueous medium either directly or after the reaction with a neutralizing agent to provide a salt, at least one ethylenically unsaturated compound (Biv) containing one reactive group capable to react with isocyanate groups, and, optionally, one or more polyol (Bvi) and/or one or more active hydrogen-containing chain extender (Bvii), wherein the polyurethane (B) has a weight average molecular weight of 1000 to 100000 Dalton.

2. The radiation curable composition according to claim 1, wherein the polyurethane (B) contains at least 3 meq of polymerisable ethylenically unsaturated groups per total weighting of polyurethane (B).

3. The radiation curable composition according to claim 1, presenting a minimum film formation temperature according to ASTM D2354 of at most 40° C.

4. The radiation curable composition according to claim 1, wherein the polyisocyanates (Ai) and (Bi) are selected from aliphatic and cycloaliphatic polyisocyanates.

5. The radiation curable composition according to claim 1, wherein the hydrophilic compounds (Aiii) and (Biii) are selected from hydroxycarboxylic acids represented by the general formula $(HO)_xR(COOH)_y$, wherein R represents a straight or branched hydrocarbon residue having 1 to 12 carbon atoms, and x and y independently are integers from 1 to 3.

6. The radiation curable composition according to claim 1, wherein the ethylenically unsaturated compounds (Aii) and (Bii) are selected from the reaction products of diglycidyl compounds with (meth)acrylic acid.

7. The radiation curable composition according to claim 6, wherein the ethylenically unsaturated compound (Aii) and (Bii) are selected from the diacrylate esters of bisphenol A diglycidylether.

8. The radiation curable composition according to claim 1, wherein the ethylenically unsaturated compound (Biv) is selected from the esterification products of aliphatic and/or aromatic polyols with (meth)acrylic acid having a residual average hydroxyl functionality of about 1.

9. The radiation curable composition according to claim 1, wherein the active hydrogen-containing chain extender (Avii) is selected from polyamines having up to 60 carbon atoms.

10. The radiation curable composition according to claim 1, comprising from 10 to 90% by weight of polyurethane (A), from 10 to 90% by weight of polyurethane (B), and optionally, from 1 to 50% by weight of an ethylenically unsaturated compound (C), wherein each of the weight percentages are relative to the total weight of polyurethane (A) and polyurethane (B), and wherein the sum of the % by weight of polyurethane (A), the % by weight of polyurethane (B), and, optionally, the % by weight of an ethylenically unsaturated compound (C) is less than or equal to 100%.

11. A process for preparing a coated article comprising coating the article with a radiation curable composition according to claim 1.

12. The process according to claim 11, wherein the radiation-curable compositions are subject to additional crosslinking reactions due to the presence of reactive functions present in the polyurethane (A), the polyurethane (B) and/or in external compounds.

13. The process according to claim 11, wherein an additional external crosslinker selected from (blocked) polyisocyanates, polyaziridines, polycarbodiimides, zirconium ammonium carbonate, polyepoxydes and polyalkoxysilanes is added to the composition.

* * * * *